United States Patent [19]

Samejima et al.

[11] Patent Number: 5,064,315
[45] Date of Patent: Nov. 12, 1991

[54] BLOWER

[75] Inventors: Kazuo Samejima; Masatake Murakawa; Junichi Kitamura, all of Osaka, Japan; Yoshiaki Matsuda; Colin Fulford, both of Compton, Calif.

[73] Assignee: Kubota Corporation, Osaka, Japan

[21] Appl. No.: 602,883

[22] Filed: Oct. 23, 1990

Related U.S. Application Data

[63] Continuation-in-part of Ser. No. 531,995, Jun. 1, 1990, abandoned.

[51] Int. Cl.⁵ ............................................. A01D 33/02
[52] U.S. Cl. ..................................................... 406/100
[58] Field of Search ................... 406/100, 193, 38, 99, 406/96, 101, 102, 103, 104

[56] References Cited

U.S. PATENT DOCUMENTS 2,478,326  8/1949  Scarth ................................ 406/193
3,152,839 10/1964  Edwards ............................ 406/193
4,174,001 11/1979  Ellis .................................... 406/100

Primary Examiner—Jesus D. Sotelo
Assistant Examiner—Stephen P. Avila
Attorney, Agent, or Firm—Jordan and Hamburg

[57] ABSTRACT

A blower for transporting grass clippings from a grass cutting unit to a grass catcher of a lawn mower comprises a housing with a protective liner extending over peripheral inside walls thereof. The liner includes a lining material formed of an elastic resin, and a core formed of a plastically deformable metal and embedded in the lining material.

3 Claims, 7 Drawing Sheets

BLOWER

This application is a continuation-in-part of application Ser. No. 531,995, filed June 1, 1990, now abandoned.

BACKGROUND OF THE INVENTION

1. Field of the Invention

This invention relates generally to blowers, and more particularly to a grass clippings blower connected to the discharge opening of a grass cutting unit of a lawn mower.

2. Description of the Prior Art

The grass clippings blower is used for transmitting grass clippings as entrained on air flows from a grass cutting unit disposed between front and rear wheels of a vehicle (midmount mower) or at the front of the vehicle (front-mount mower) to a grass catcher mounted at the rear of the vehicle. For this purpose, the blower is connected to a grass discharge opening defined laterally of the blade housing of the grass cutting unit.

The blower desirably is lightweight to little affect the right and left weight balance of the grass cutting unit. Further, the blower has rotary blades and a housing supporting the blades which are formed of a resin such as vinyl chloride to avoid adhesion thereto of grass clippings.

However, the blower housing formed of a resin has the disadvantage that its peripheral inside walls tend to wear quickly through frictional contact with sand and pebbles delivered thereto along with grass clippings.

Conventionally, therefore, the blower of a mower used under conditions laden with sand and pebbles has a liner of steel sheet applied along its peripheral inside walls. This measure, however, fails to provide a drastic solution, only prolonging the duration of service till the liner becomes worn. It has the further disadvantages that noise is produced by the sand and pebbles colliding with the liner, and that the blower with a thick liner has an increased weight.

SUMMARY OF THE INVENTION

An object of this invention is to overcome the disadvantages noted above by improving the liner applied to the peripheral inside walls of a blower housing.

In order to achieve the above object, a blower according to this invention, for example, a blower for a lawn mower comprises a housing, and a liner extending over peripheral inside walls of the housing, the liner including a lining material formed of an elastic resin, and a core formed of a plastically deformable metal and embedded in the lining material.

In a preferred form of the invention, a blower for a lawn mower comprises a housing, and a liner extending along peripheral inside walls of the housing, the liner including a lining material formed of an elastic resin, and a core formed of a plastically deformable metal and embedded in the lining material throughout an entire length of the lining material, the lining material being thinned at positions where the liner is to be bent.

In another form of the invention, a blower for a lawn mower comprises a housing, and a liner extending along peripheral inside walls of the housing, the liner including a lining material formed of an elastic resin, and a core formed of a plastically deformable metal and embedded in the lining material, the lining material having a uniform thickness throughout an entire length thereof, and the core being removed from positions where the liner is to be bent.

The above two forms may be combined to provide a blower for a lawn mower comprising a housing, and a liner extending along peripheral inside walls of the housing, the liner including a lining material formed of an elastic resin, and a core formed of a plastically deformable metal and embedded in the lining material, the lining material being thinned at positions where the liner is to be bent, and the core being removed from the positions.

The construction of this invention employs a liner formed of an elastic resin such as polyethylene or polyurethane which provides a greatly improved wear resistance against sand and pebbles. It has been found through experiments that housings without the liner had holes in their peripheral walls after 50 to 100 hours of operation, whereas housings with the resin liner showed hardly any wear after 600 hours of operation.

It is difficult to cause the resin liner to closely follow the peripheral inside walls of the housing since the liner tends to lift from the inside walls because of its elasticity. However, the plastic deformation of the metallic core maintains the liner in a desired curved shape positively following the peripheral inside walls. To further facilitate bending of the liner, the lining material may be thinned at positions where the liner is to be bent, and/or the core may be removed from such positions.

According to this invention, as described above, the liner formed of an elastic resin provides a greatly improved wear resistance, minimizes the noise produced by sand and pebbles colliding with the liner, and prevents adhesion of grass clippings.

The liner with the metallic core embedded is suitably applicable along the peripheral inside walls, to form an inside surface for smoothly guiding grass clippings without the inconvenience of lifting from the inside walls to contact the rotating fan.

Since the metallic core is provided to maintain the shape of the liner against the elastic restoring force, a thin and light material such as a wire netting or punched metal or expanded metal is adequate for the purpose. Such a liner does not significantly increase the weight of the entire blower, but is effective to render the blower highly durable and yet lightweight.

The blower of the present invention may be utilized in conjunction with any device requiring such a blower.

Other features and advantages of this invention will be apparent from the following description.

BRIEF DESCRIPTION OF THE DRAWINGS

The drawings show several embodiments of blowers according to this invention in conjunction with lawn mowers, in which.

DESCRIPTION OF THE PREFERRED EMBODIMENTS

An embodiment of the invention will be described hereinafter with reference to the drawings.

Figure 4:
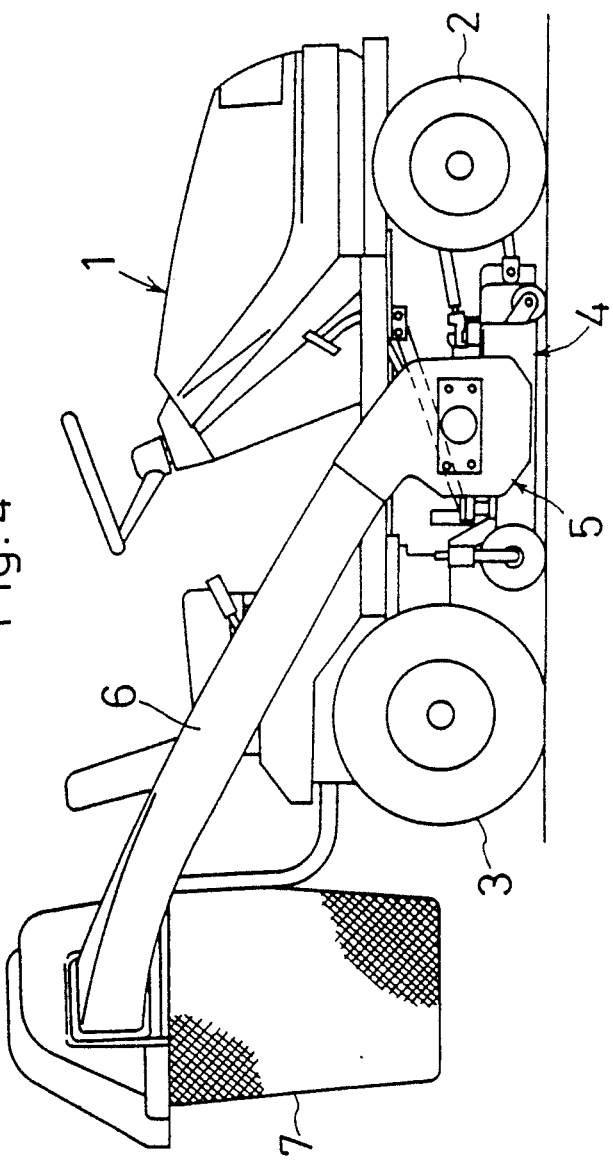
FIG. 4 is a side elevation of a riding type lawn mower.

FIG. 4 shows a garden tractor or riding lawn mower according to the invention. This tractor comprises a tractor body 1, a mower or grass cutting unit 4 vertically movably connected to the tractor body 1 between front wheels 2 and rear wheels 3. Grass clippings are transmitted rearwardly as entrained on air flows through a blower 5 connected to a lateral end of the cutting unit 4 and through a duct 6 to a grass catcher bag 7 disposed rearwardly of the tractor body 1.

Figure 5:
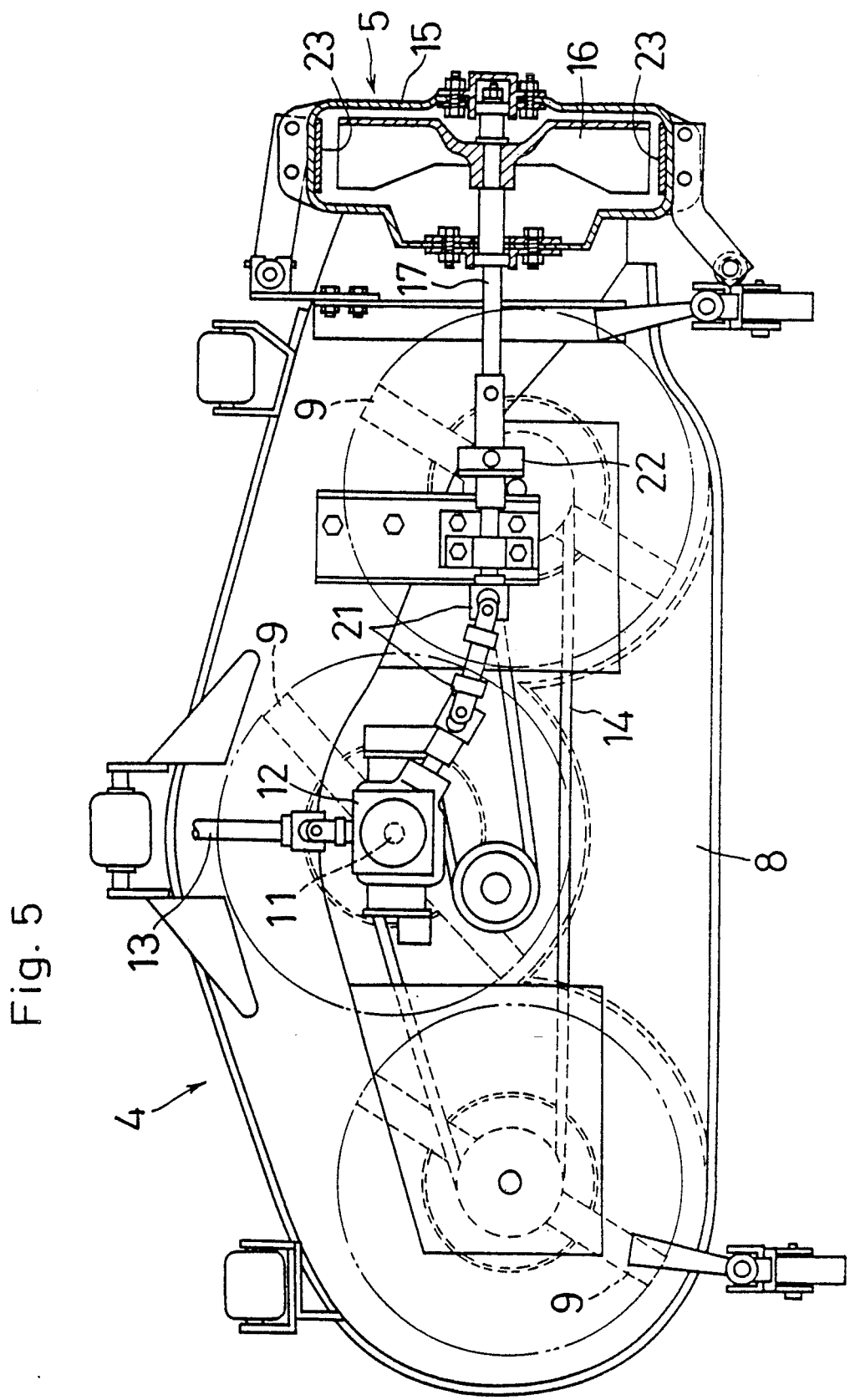
FIG. 5 is a plan view of a grass cutting unit.
Figure 6:
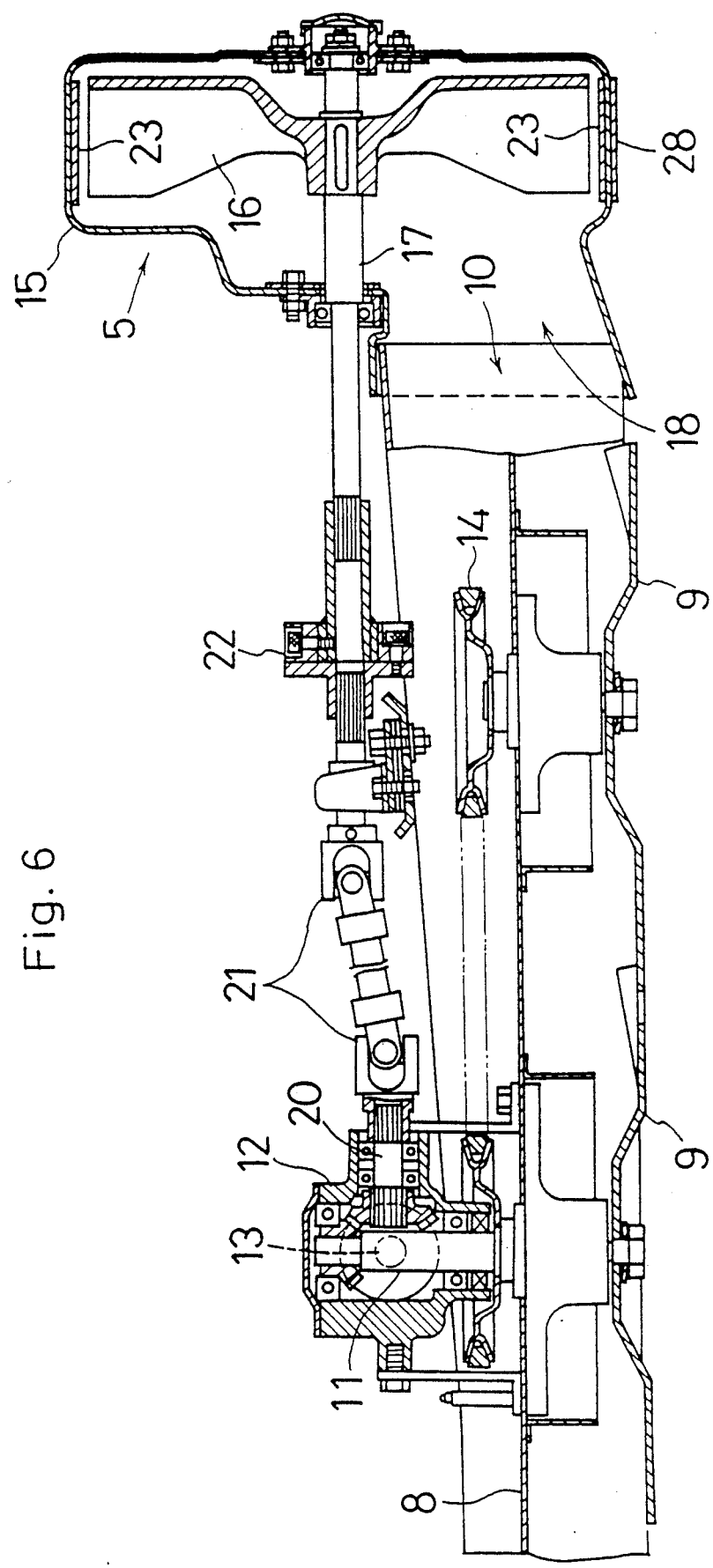
FIG. 6 is a rear view in vertical section of a blower drive structure.

As shown in FIGS. 5 and 6, the grass cutting unit 4 includes a downwardly opening blade housing 8 accommodating three rotary blades 9. The blades 9 are arranged transversely and rotatable on vertical axes in the same direction (clockwise in FIG. 5). The blade housing 8 defines a grass discharge opening 10 at the righthand end thereof.

The blade housing 8 carries a bevel gear case 12 mounted on a transversely mid-position of the top surface thereof and supporting a center blade shaft 11. Power is transmitted from a forward section of the tractor body 1 through a transmission shaft 13 to the gear case 12. The power undergoes a directional change in the gear case 12 for transmission to the center blade shaft 11. The power is then distributed from the center blade shaft 11 to the right and left blades 9 through a belt 14.

The blower 5 includes a housing 15 formed of vinyl chloride, a fan 16 also formed of vinyl chloride, and a blower shaft 17. The housing 15 defines a grass inlet 18 in a lower left position thereof for connection to the grass discharge opening 10 of the blade housing 8. The housing 15 further defines a grass outlet 19 in a top position thereof for connection to a forward end of the duct 6. The blower shaft 16 is operatively connected to a horizontal output shaft 20 included in the bevel gear case 12, through a pair of universal joints 21 and an elastic coupling 22.

The blower housing 15 has a liner 23 applied to peripheral inside walls thereof.

Figure 1:
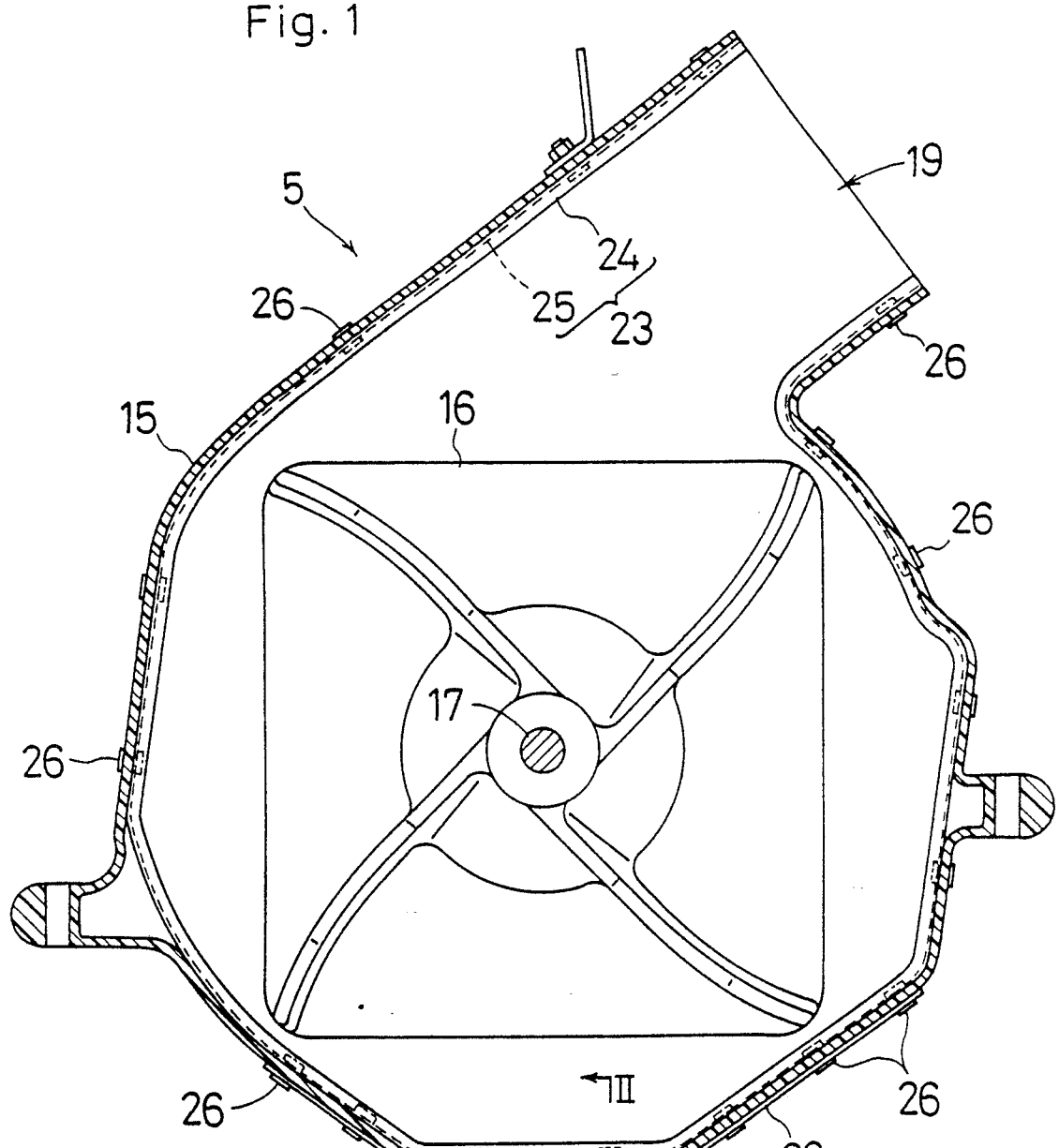
FIG. 1 is a side view in vertical section of a blower.
Figure 2:
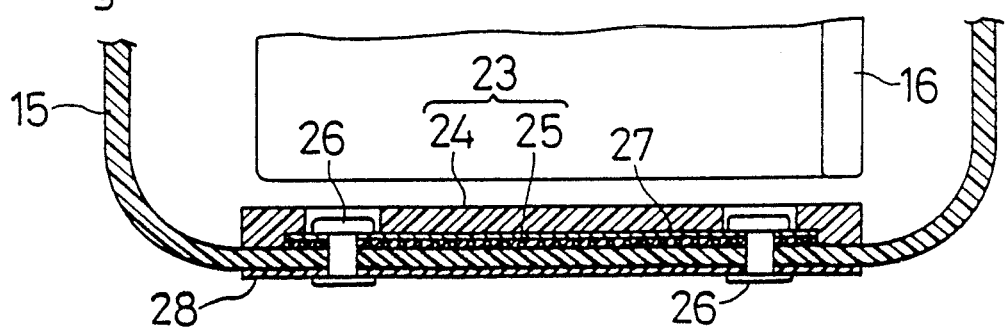
FIG. 2 is an enlarged view in section taken on line II—II in FIG. 1.
Figure 3:
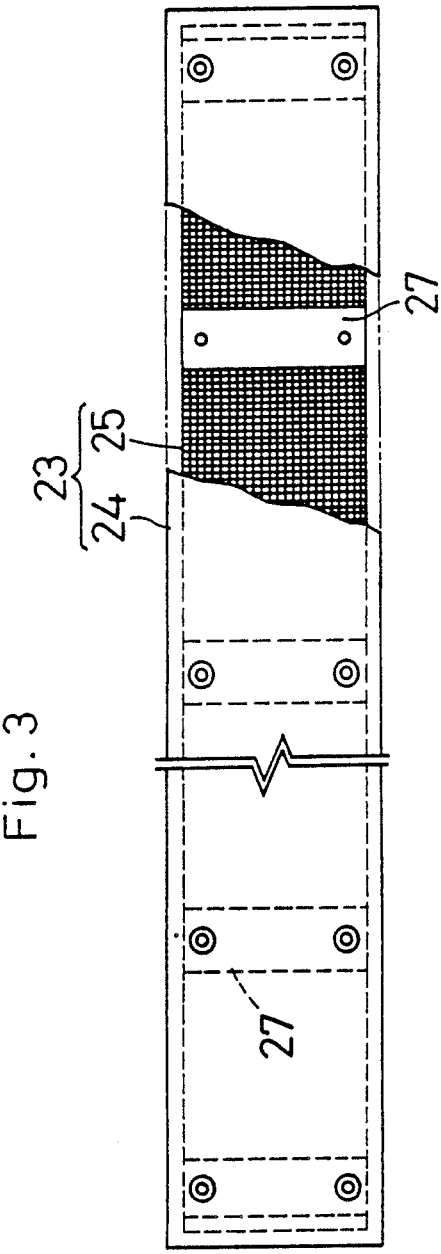
FIG. 3 is a developed plan view, partly broken away, of a liner.

Referring to FIGS. 1 through 3, the liner 23 includes a lining material 24 of an elastic resin such as polyurethane or polyethylene, and a metallic core 25 capable of plastic deformation embedded in the lining material 24. Consequently, the liner 23 is in a belt form having a thickness on the order of ¼ inch.

The core 25 is formed of stainless steel netting or wire cloth. When the liner 23 is curved to follow the shape of the peripheral inside walls of the housing 15, the liner 23 is maintained in the curved shape by the core 25 in plastic deformation which overcomes the elastic restoring force of the lining material 24. The core 25 may comprise a punched sheet of stainless steel or aluminum.

The liner 23 is connected to appropriate positions on the peripheral inside walls of the housing 15 by rivets 26. Reinforcing steel sheets 27 are embedded in the rivet connecting positions of the liner 23.

The housing 15 has a reinforcing plate 28 extending over and riveted to an outer bottom surface thereof, along with the liner 23. This plate 28 protects the bottom of the housing 15 from wear and damage through contact with the ground.

Several other embodiments of the present invention will be set out hereunder.

Figure 7:
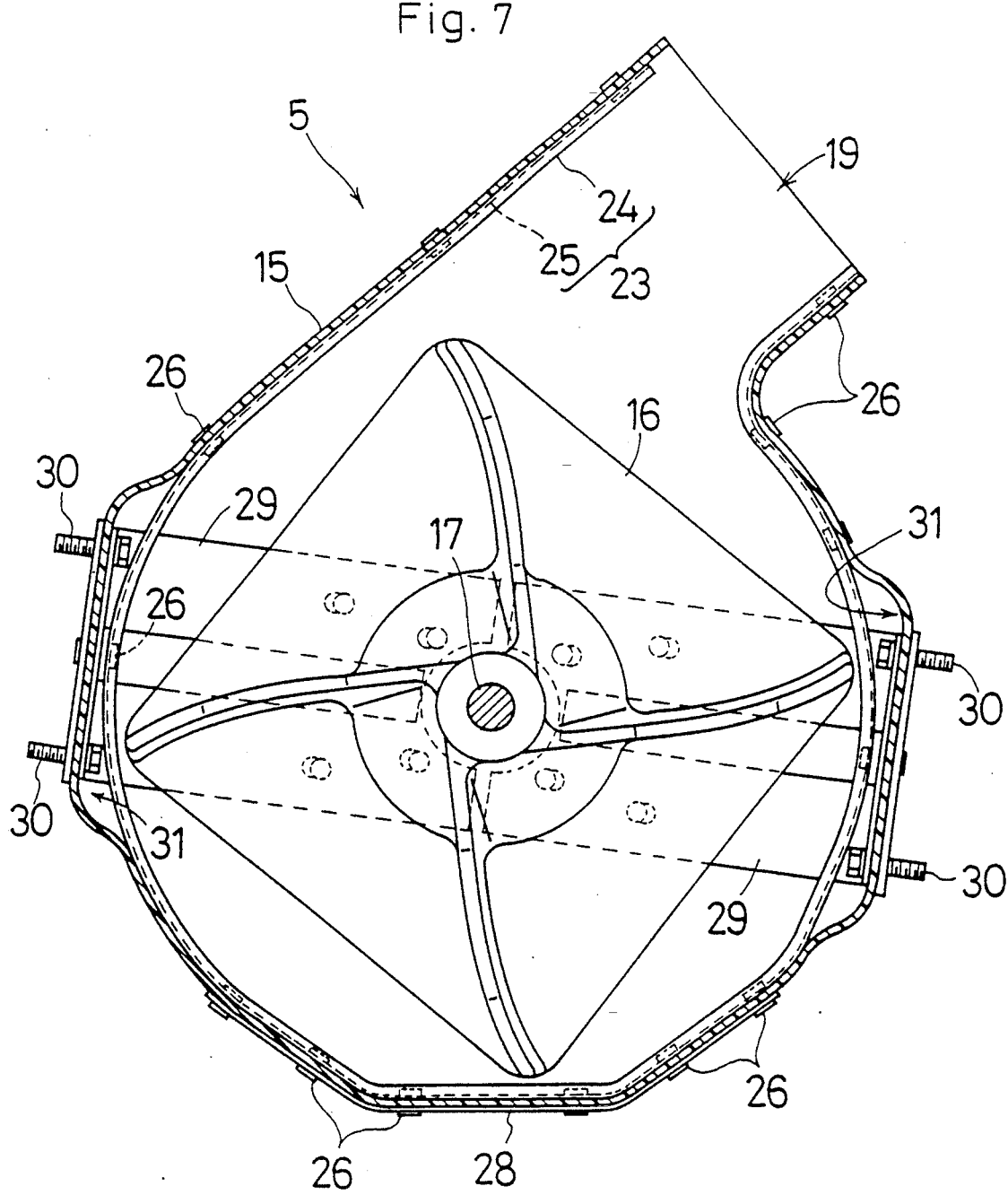
FIG. 7 is a side view in vertical section of a blower in another embodiment.

(1) FIG. 7 shows a different type of blower housing 15 which includes recessed peripheral inside walls for accommodating the heads of bolts 30 which secure bearing reinforcing plates 29 in position. As shown, the liner 23 may extend to cover the heads of bolts 30, thereby preventing wear of the bolts 30 and adhesion thereto of grass clippings.

Figure 8:
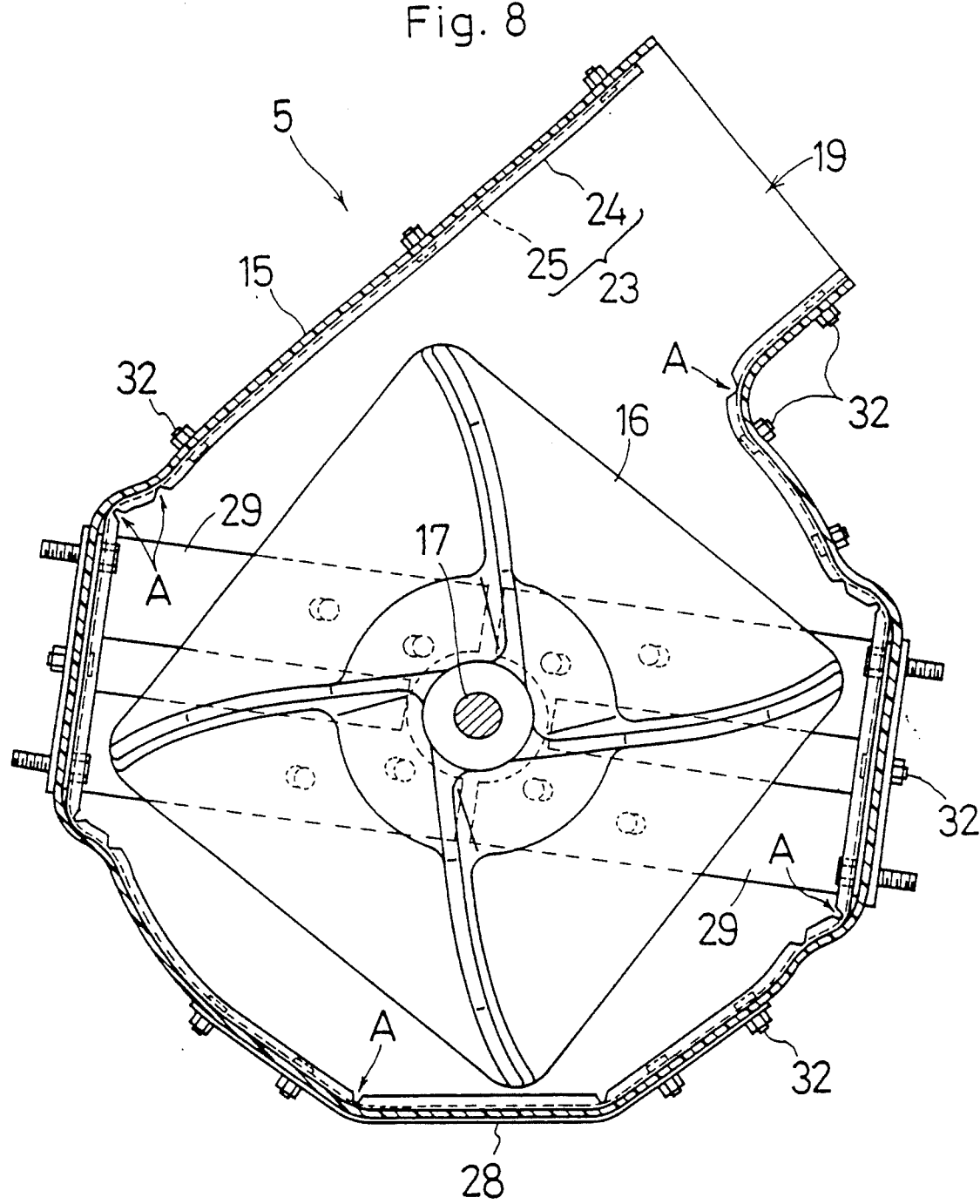
FIG. 8 is a side view in vertical section of a blower in a further embodiment.
Figure 9:
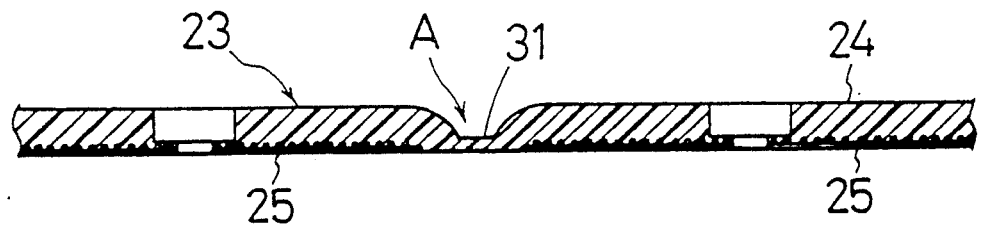
FIG. 9 is a side view in vertical section of a portion of a liner used in the embodiment of FIG. 8.
Figure 10:
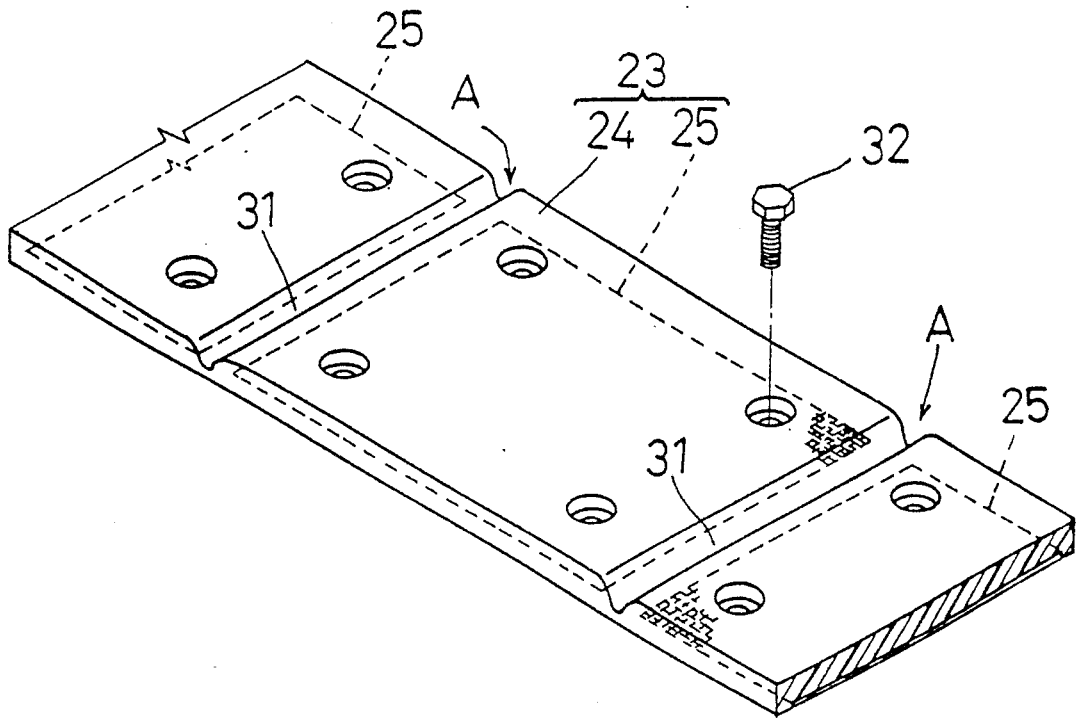
FIG. 10 is a perspective view of a portion of the liner used in the embodiment of FIG. 8, FIGS. 11 and 12 are side views in vertical section of modified liners, respectively.

(2) As shown in FIGS. 8 through 10, the liner 23 may comprise a lining material 24 including thin parts in the form of recesses 31 defined in the inward surface thereof where the liner 23 is to be bent as referenced A. Parts of the core 25 are removed from such positions A. The liner 23 constructed in this way is capable of following the peripheral inside walls of the housing 15 with greater facility. In this embodiment, the liner 23 is attached to the housing 15 by bolts 32 to allow change of the liner 23.

Figure 11:
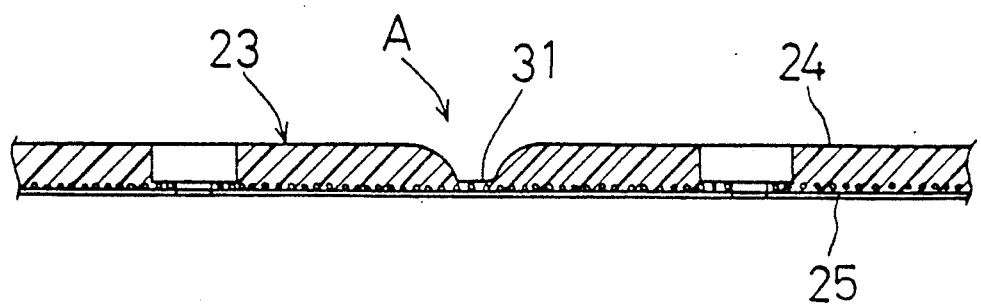

(3) As shown in FIG. 11, the core 23 may be embedded in the liner 23 throughout its length, with the lining material 24 defining recesses 31 at positions A where the liner 23 is to be bent. This construction will allow the liner 23 to be bent relatively easily at the positions A.

Figure 12:
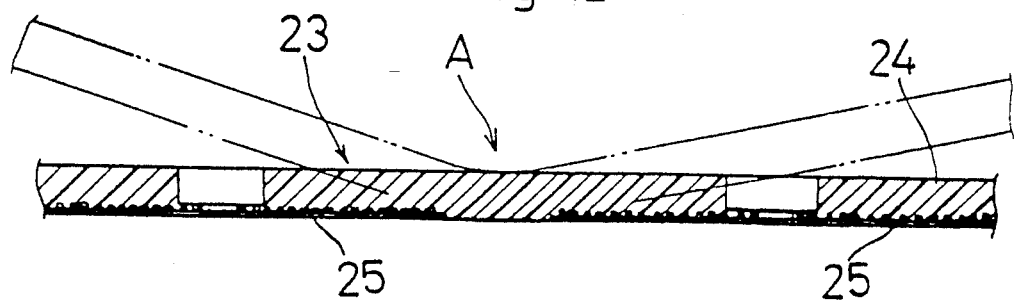

(4) As shown in FIG. 12, the lining material 24 may have a uniform thickness over the entire length of the liner 23, with portions of the core 25 removed from positions A where the liner 23 is to be bent. This construction will also facilitate bending of the liner 23.

While the invention has been described with reference to several specific embodiments, it will be readily appreciated that such are illustrative and not limitative. Various modifications will suggest themselves to those of ordinary skill in the art. For example, while the blower of the present invention has been described with reference to a lawn mower, it will be readily appreciated that the blower may be utilized with a variety of other devices, such as a blower for a grain elevator, a blower for a combine, a blower for a sweeper, a blower for a sawmill, and so forth, besides a lawn mower.

We claim:

1. A blower comprising a housing for a fan, and a liner extending along peripheral inside walls of said housing for the fan, said liner including a lining material formed of an elastic resin, and a core formed of a plastically deformable metal and embedded in said lining material throughout an entire length of said lining material, said lining material being thinned at positions where said liner is to be bent.

2. A blower comprising a housing for a fan, and a liner extending along peripheral inside walls of said housing for the fan, said liner including a lining material formed of an elastic resin, and a core formed of a plastically deformable metal and embedded in said lining material, said lining material having a uniform thickness throughout an entire length thereof, and said core being removed from positions where said liner is to be bent.

3. A blower comprising a housing for a fan, and a liner extending along peripheral inside walls of said housing for the fan, said liner including a lining material formed of an elastic resin, and a core formed of a plastically deformable metal and embedded in said lining material, said lining material being thinned at positions (A) where said liner is to be bent, and said core being removed from said positions.

* * * * *